United States Patent
Kim et al.

(10) Patent No.: US 12,104,672 B2
(45) Date of Patent: Oct. 1, 2024

(54) INFLATABLE WITH ELASTIC CONSTRAINT TETHERS

(71) Applicants: GM Global Technology Operations LLC, Detroit, MI (US); Regents of the University of Michigan, Ann Arbor, MI (US)

(72) Inventors: Wonhee Michael Kim, Royal Oak, MI (US); Paul W. Alexander, Ypsilanti, MI (US); Diann Brei, Milford, MI (US); Jonathan E. Luntz, Ann Arbor, MI (US); Koray Benli, Ann Arbor, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 187 days.

(21) Appl. No.: 17/825,218

(22) Filed: May 26, 2022

(65) Prior Publication Data
US 2023/0383811 A1  Nov. 30, 2023

(51) Int. Cl.
*F16F 9/04* (2006.01)

(52) U.S. Cl.
CPC .......... *F16F 9/04* (2013.01); *F16F 2222/126* (2013.01); *F16F 2236/04* (2013.01)

(58) Field of Classification Search
CPC .... F16F 9/04; F16F 2222/126; F16F 2236/04; B66F 3/35; B66F 3/36; B66F 7/085
See application file for complete search history.

(56) References Cited

U.S. PATENT DOCUMENTS

| | | | | |
|---|---|---|---|---|
| 277,979 A | * | 5/1883 | Name not available | A47C 27/081 5/644 |
| 2,609,177 A | * | 9/1952 | Hughes | B66F 3/35 254/93 HP |
| 2,610,824 A | * | 12/1977 | Grier | B66F 3/35 92/45 |
| 4,061,310 A | * | 12/1977 | Vetter | B66F 3/35 254/93 HP |
| 4,675,930 A | * | 6/1987 | Sargent | A47G 9/10 5/655.4 |
| 4,762,298 A | | 8/1988 | Wood | |
| 4,782,542 A | * | 11/1988 | Sato | A47C 20/048 5/706 |

(Continued)

FOREIGN PATENT DOCUMENTS

JP  6238296 B2 * 11/2017

*Primary Examiner* — Eret C McNichols
(74) *Attorney, Agent, or Firm* — Vivacqua Crane, PLLC (57) ABSTRACT

An inflatable structure includes a top end cap, a bottom end cap, a bladder attached to the top and bottom end caps and configured to hold pressurized air therebetween, and a plurality of tethers disposed within the bladder, each tether in the plurality of tethers having a first end coupled to the top end cap and a second end coupled to the bottom end cap, wherein when the bladder is inflated, the bladder expands axially forcing the top end cap and the bottom end cap away from one another, the plurality of tethers adapted to restrict movement of the top end cap and the bottom end cap away from one another and limit axial expansion of the bladder, wherein, at least one of the plurality of tethers is elastic, and the inflatable structure is adapted to provide multiple support profiles that are capable of supporting compressive loading.

20 Claims, 6 Drawing Sheets

(56) References Cited

U.S. PATENT DOCUMENTS

| | | | | |
|---|---|---|---|---|
| 4,826,715 A * | 5/1989 | Lee | | A47C 27/081 |
| | | | | 428/64.1 |
| 5,014,378 A * | 5/1991 | Sato | | A47C 20/048 |
| | | | | 5/713 |
| 5,492,300 A * | 2/1996 | Riihiluoma | | B66F 3/22 |
| | | | | 248/354.1 |
| 5,529,293 A * | 6/1996 | Haugs | | B66F 3/35 |
| | | | | 92/92 |
| 5,975,643 A * | 11/1999 | Smith | | B60P 1/16 |
| | | | | 298/22 R |
| 6,286,813 B1 * | 9/2001 | Coccaro | | B66F 3/35 |
| | | | | 254/93 HP |
| 7,062,814 B2 * | 6/2006 | Bender | | B65G 69/2817 |
| | | | | 14/71.3 |
| 7,070,167 B1 * | 7/2006 | Bacon | | B66F 7/085 |
| | | | | 254/93 HP |
| 7,234,184 B2 * | 6/2007 | Yang | | A47C 27/087 |
| | | | | 5/644 |
| 7,694,372 B1 * | 4/2010 | Boyd | | A47C 27/081 |
| | | | | 5/711 |
| 7,758,476 B2 * | 7/2010 | Chu | | A63B 69/305 |
| | | | | 482/86 |
| 7,799,987 B1 * | 9/2010 | Hines | | H02S 20/32 |
| | | | | 136/246 |
| 7,926,787 B2 | 4/2011 | Wieland | | |
| 9,162,857 B2 * | 10/2015 | Coccaro | | B66F 3/35 |
| 11,084,541 B2 * | 8/2021 | Kim | | F16H 1/28 |
| 11,330,914 B2 * | 5/2022 | Ocegueda Gallaga | | |
| | | | | B29C 66/433 |
| 11,332,349 B2 * | 5/2022 | Wakabayashi | | B66F 3/247 |
| 11,614,083 B2 * | 3/2023 | Kim | | F04B 49/00 |
| | | | | 137/224 |
| 11,912,546 B2 * | 2/2024 | Kim | | B66F 3/35 |
| 2006/0288489 A1 * | 12/2006 | Yang | | A47C 27/081 |
| | | | | 5/711 |
| 2007/0062364 A1 * | 3/2007 | Luchsinger | | B66F 3/35 |
| | | | | 91/5 |
| 2013/0187107 A1 * | 7/2013 | Coccaro | | B66F 3/35 |
| | | | | 254/93 R |
| 2018/0273360 A1 * | 9/2018 | Nasrin | | B66F 3/35 |
| 2019/0195427 A1 * | 6/2019 | Alexander | | B32B 7/12 |
| 2019/0299909 A1 * | 10/2019 | Alexander | | B62D 1/183 |
| 2021/0070381 A1 * | 3/2021 | Kim | | B62D 37/02 |
| 2021/0071659 A1 * | 3/2021 | Kim | | A47C 7/506 |
| 2023/0406679 A1 * | 12/2023 | Hobbs | | B66F 3/35 |

* cited by examiner

INFLATABLE WITH ELASTIC CONSTRAINT TETHERS

INTRODUCTION

The present disclosure relates to inflatable structures that provide multiple support structures.

Internally tensioned inflatable structures typically include a bladder that holds pressurized air and tethers that are attached to opposite internal surfaces of the bladder. As the bladder is inflated, the pressure within the bladder causes the bladder to expand outward and thereby, ultimately applies tension to the tethers, which in turn limits expansion of the bladder. In addition to limiting expansion of the bladder, the tethers increase the amount of compressive load that the bladder may withstand before the bladder deforms due to the compressive load.

In known inflatable structures, when the bladder is not inflated, there is no tension on the tethers and the tethers are slack. When pressure is applied within the bladder, the bladder begins to expand. The bladder does not need to overcome any resistance to expansion, and any pressure above atmospheric will cause the bladder to expand. Because there is no resistance to expansion, the pressure within the bladder does not increase substantially until the bladder is fully inflated. Thus, the bladder is incapable of supporting any significant load until the bladder is fully expanded. Once the bladder is fully expanded, and the tethers are tensioned, pressure can build up within the bladder such that the bladder is capable of supporting load. The higher the pressure within the bladder, the more compressive loading the bladder is capable of supporting before the bladder deforms due to the compressive load.

Thus, while current inflatable structures achieve their intended purpose, there is a need for a new and improved inflatable structure that includes at least one elastic tether and is capable of providing multiple support profiles that are capable of supporting compressive loads.

SUMMARY

According to several aspects of the present disclosure, an inflatable structure includes a top end cap, a bottom end cap, a bladder attached to the top and bottom end caps and configured to hold pressurized air between the top and bottom end caps, and a plurality of tethers disposed within the bladder, each tether in the plurality of tethers having a first end coupled to the top end cap and a second end coupled to the bottom end cap, wherein when the bladder is inflated, the bladder expands axially forcing the top end cap and the bottom end cap away from one another, the plurality of tethers adapted to restrict movement of the top end cap and the bottom end cap away from one another and limit axial expansion of the bladder, wherein, at least one of the plurality of tethers is elastic, and the inflatable structure is adapted to provide multiple support profiles that are capable of supporting compressive loading.

According to another aspect, the inflatable structure includes a final support profile, wherein all of the plurality of tethers are extended to an ultimate length, and at least one intermediate support profile, wherein at least one of the plurality of tethers is not extended to an ultimate length.

According to another aspect, the at least one elastic tether comprises one of an elastic band, a spring, and an elastic core surrounded by an inelastic outer winding.

According to another aspect, at least one of the plurality of tethers has an ultimate length that is different than an ultimate length of the remaining of the plurality of tethers.

According to another aspect, all of the plurality of tethers are elastic and have an equal stiffness.

According to another aspect, all of the plurality of tethers have an equal ultimate length.

According to another aspect, at least one of the plurality of tethers has a stiffness that is different than a stiffness of the remaining of the plurality of tethers.

According to another aspect, all of the plurality of tethers have an equal stiffness.

According to another aspect, at least one of the plurality of tethers is pre-tensioned.

According to another aspect, the at least one elastic tether includes a first segment and a second segment, the first and second tether segments attached to one another end to end.

According to another aspect, the first tether segment has a stiffness that is different than a stiffness of the second tether segment.

According to another aspect, only one of the first segment and the second segment is elastic.

According to another aspect, the first tether segment has an ultimate length that is different than an ultimate length of the second tether segment.

According to another aspect, one of the first tether and the second tether is pre-tensioned.

According to another aspect, an orientation of the top end cap when the inflatable structure is in the final support profile is different than an orientation of the top end cap when the inflatable structure is in the at least one intermediate support profile.

According to several aspects of the present disclosure, an inflatable structure includes a top end cap, a bottom end cap, a bladder attached to the top and bottom end caps and configured to hold pressurized air between the top and bottom end caps, and a plurality of tethers disposed within the bladder, each tether in the plurality of tethers having a first end coupled to the top end cap and a second end coupled to the bottom end cap, wherein when the bladder is inflated, the bladder expands axially forcing the top end cap and the bottom end cap away from one another, the plurality of tethers adapted to restrict movement of the top end cap and the bottom end cap away from one another and limit axial expansion of the bladder, wherein, at least one of the plurality of tethers is elastic, and the inflatable structure includes a final support profile, wherein all of the plurality of tethers are extended to an ultimate length, and at least one intermediate support profile, wherein at least one of the plurality of tethers is not extended to an ultimate length.

According to another aspect, at least one of the plurality of tethers has an ultimate length that is different that an ultimate length of the remaining of the plurality of tethers, and all of the plurality of tethers are elastic and have an equal stiffness.

According to another aspect, all of the plurality of tethers have an equal ultimate length, and one of at least one of the plurality of tethers has a stiffness that is different than a stiffness of the remaining of the plurality of tethers, and all of the plurality of tethers have an equal stiffness, and at least one of the plurality of tethers is pre-tensioned.

According to another aspect, the at least one elastic tether includes a first tether segment and a second tether segment, the first and second tether segments attached to one another end to end, at least one of the first tether segment and the second tether segment being elastic, the first tether segment having a stiffness that is different than a stiffness of the second tether segment, and the first tether segment having an ultimate length that is different than an ultimate length of the second tether segment.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

The figures are not necessarily to scale and some features may be exaggerated or minimized, such as to show details of particular components. In some instances, well-known components, systems, materials or methods have not been described in detail in order to avoid obscuring the present disclosure. Therefore, specific structural and functional details disclosed herein are not to be interpreted as limiting, but merely as a basis for the claims and as a representative basis for teaching one skilled in the art to variously employ the present disclosure.

DETAILED DESCRIPTION

The following description is merely exemplary in nature and is not intended to limit the present disclosure, application, or uses. Furthermore, there is no intention to be bound by any expressed or implied theory presented in the preceding technical field, background, brief summary or the following detailed description. It should be understood that throughout the drawings, corresponding reference numerals indicate like or corresponding parts and features. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality. Although the figures shown herein depict an example with certain arrangements of elements, additional intervening elements, devices, features, or components may be present in actual embodiments. It should also be understood that the figures are merely illustrative and may not be drawn to scale.

As used herein, the term "vehicle" is not limited to automobiles. While the present technology is described primarily herein in connection with automobiles, the technology is not limited to automobiles. The concepts can be used in a wide variety of applications, such as in connection with aircraft, marine craft, other vehicles, and consumer electronic components.

Referring to FIG. 1A through FIG. 1E, an inflatable structure 10 in accordance with the present disclosure includes a top end cap 12, a bottom end cap 14, a bladder 16 attached to the top and bottom end caps 12, 14 and configured to hold pressurized air between the top and bottom end caps 12, 14, and a plurality of tethers 18 disposed within the bladder 16. Each tether 18 in the plurality of tethers 18 has a first end 20 coupled to the top end cap 12 and a second end 22 coupled to the bottom end cap 14. When the bladder 16 is inflated, the bladder 16 expands axially, as indicated by arrow 24, forcing the top end cap 12 and the bottom end cap 14 away from one another. The plurality of tethers 18 are adapted to restrict movement of the top end cap 12 and the bottom end cap 14 away from one another and limit axial expansion of the bladder 16. At least one of the plurality of tethers 18 is elastic, and the inflatable structure 10 is adapted to provide multiple support profiles 26 that are capable of supporting compressive loading.

In the inflatable structures described herein, it is assumed that the bottom end cap 14 is stationary or fixed in space, and movement of the top end cap 12 is only constrained by the tethers 18 that connect the top and bottom end caps 12, 14 to one another. However, in various implementations, the top end cap 12 may be stationary or fixed in space, and movement of the bottom end cap 14 may only be constrained by the tethers 18 that connect the top and bottom end caps 12, 14 to one another. In other implementations, neither one of the top or bottom end caps 12, 14 may be stationary or fixed in space, and movement of the top and bottom end caps 12, 14 may only be constrained by the tethers 18 that connect the top and bottom end caps 12, 14 to one another. In exemplary embodiments, the at least one elastic tether 18 is one of an elastic band, a spring, and an elastic core surrounded by an inelastic outer winding.

In an exemplary embodiment, the inflatable structure 10 includes a final support profile 26F, wherein all of the plurality of tethers 18 are extended to an ultimate length, and at least one intermediate support profile 26I, wherein at least one of the plurality of tethers 18 is not extended to an ultimate length. For an inelastic tether 18, the ultimate length is the fully extended length of the tether 18. For an elastic tether 18, the ultimate length is the length at which the tether 18 cannot be further stretched.

Figure 1A:
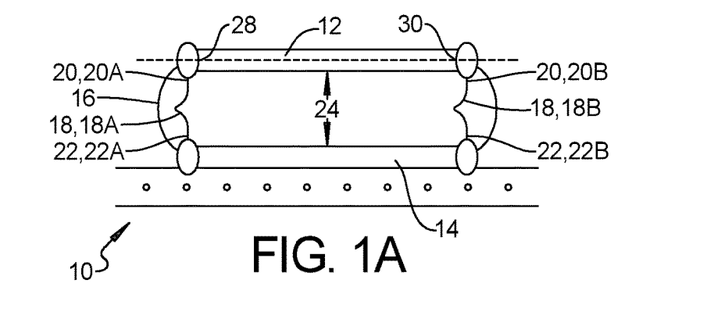
FIG. 1A is a schematic view of an inflatable structure in accordance with an exemplary embodiment including first and second tethers that have equal stiffness and different ultimate lengths.

Referring to FIG. 1A, the inflatable structure 10 includes a first tether 18A disposed within the bladder 16 that has a first end 20A coupled to the top end cap 12 at a first side 28 and a second end 22A coupled to the bottom end cap 14. A second tether 18B is disposed within the bladder 16 and includes a first end 20B coupled to the top end cap 12 at a second side 30 and a second end 22B coupled to the bottom end cap 14. In an exemplary embodiment, each of the first and second tethers 18A, 18B is elastic.

Figures 1B, 1C:
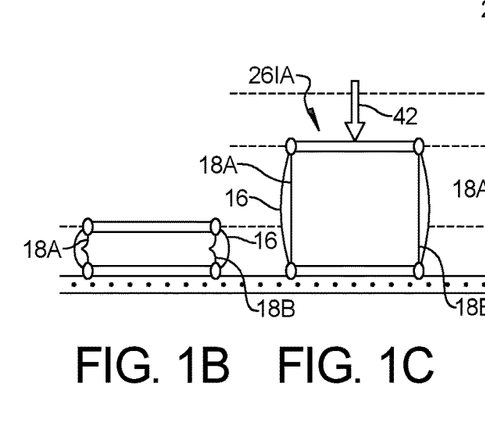
FIG. 1B is a schematic view of the inflatable structure shown in FIG. 1A, wherein the bladder is pressurized to one psi.
FIG. 1C is a schematic view of the inflatable structure shown in FIG. 1A, wherein the bladder is pressurized to five psi.
Figure 2:
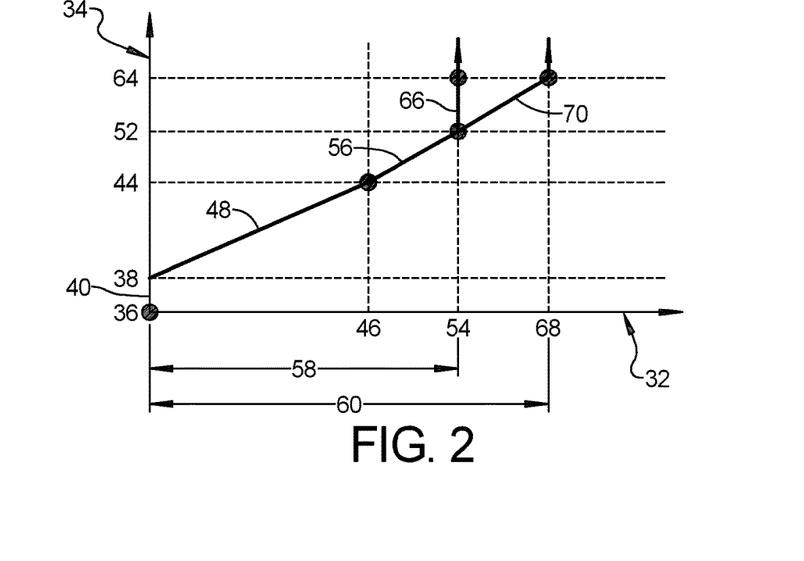
FIG. 2 is a graph plotting the length of the first and second tethers vs. the pressure within the bladder for the inflatable structure shown in FIG. 1A.

Referring to FIG. 2, a graph having an x-axis 32 representing the length of the first and second tethers 18A, 18B, and a y-axis 34 representing the pressure within the bladder 16 is shown. Referring again to FIG. 1A, the inflatable structure 10 is shown wherein the pressure within the bladder 16 is zero psi. Referring to FIG. 1B, the inflatable structure 10 is shown wherein the pressure within the bladder 16 is one psi. As shown, the bladder 16 has not expanded. This is due to the fact that one psi is not enough pressure to overcome the elasticity of the first and second tethers 18A, 18B, so the top end cap 12 does not move relative to the bottom end cap 14. Referring to FIG. 2, the pressure increases from zero psi 36 to one psi 38, and the length of both the first and second tethers 18A, 18B does not increase, as indicated by line segment 40.

Referring to FIG. 1C, the inflatable structure 10 is shown wherein the pressure within the bladder 16 is five psi. In an exemplary embodiment, both of the first and second tethers 18A, 18B are elastic and have an equal stiffness. As shown, five psi is sufficient to overcome the stiffness of each of the first and second tethers 18A, 18B, and each of the first and second tethers 18A, 18B begins to stretch. Because the stiffness of the first and second tethers 18A, 18B is equal, they stretch equally, and thus, the orientation of the top end cap 12 remains flat, as shown in FIG. 1C. The inflatable structure 10, as shown in FIG. 1C, provides a first intermediary support profile 26IA that is capable of supporting a compressive load. Due to the elasticity of the first and second tethers 18A, 18B, five psi of pressure within the bladder 16 is required to force the bladder 16 to expand to the first intermediary support profile 26IA, and thus, the pressurized bladder 16 is capable of providing support for a compressive load, as indicated by arrow 42. Referring to FIG. 2, as the pressure increases from one psi 38, to five psi 44, the length of both the first and second tethers 18A, 18B increases from zero to a first length 46, as indicated by line segment 48.

Figure 1D:
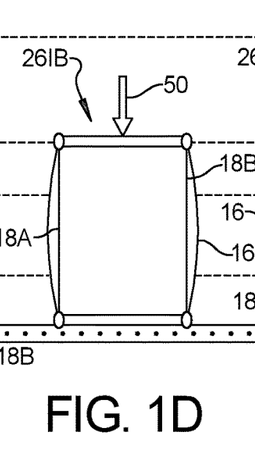
FIG. 1D is a schematic view of the inflatable structure shown in FIG. 1A, wherein the bladder is pressurized to seven psi.

Referring to FIG. 1D, the inflatable structure 10 is shown wherein the pressure within the bladder 16 is seven psi, which is sufficient to further stretch each of the first and second tethers 18A, 18B. Because the stiffness of the first and second tethers 18A, 18B is equal, they stretch equally, and thus, the orientation of the top end cap 12 remains flat, as shown in FIG. 1D. The inflatable structure 10, as shown in FIG. 1D, provides a second intermediary support profile 26IB that is capable of supporting a compressive load. Due to the elasticity of the first and second tethers 18A, 18B, seven psi of pressure within the bladder 16 is required to force the bladder 16 to expand to the second intermediary support profile 26IB, and thus, the pressurized bladder 16 is capable of providing support for a compressive load, as indicated by arrow 50. The amount of compressive load that the inflatable structure 10 can support in the second intermediary support profile 26IB is higher than the amount of compressive load that the inflatable structure 10 can support in the first intermediary support profile 26IA due to the increase in the internal pressure of the bladder 16. Referring to FIG. 2, as the pressure increases from five psi 44 to seven psi 52, the length of both the first and second tethers 18A, 18B increases from the first length 46 to a second length 54, as indicated by line segment 56. At this point, when the internal pressure within the bladder 16 is seven psi, the first tether 18A has been stretched to its' ultimate length 58, and cannot be stretched further.

Figure 1E:
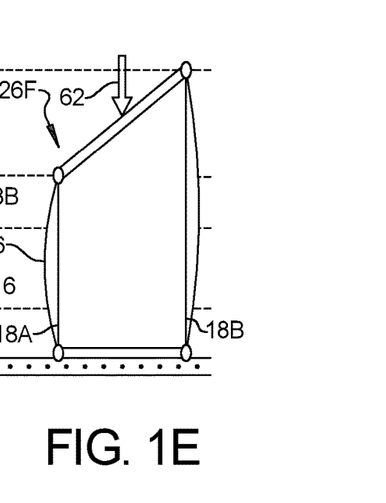
FIG. 1E is a schematic view of the inflatable structure shown in FIG. 1A, wherein the bladder is pressurized to nine psi.

Referring to FIG. 1E, the inflatable structure 10 is shown wherein the pressure within the bladder 16 is nine psi, which is sufficient to further stretch the second tether 18B. Because the ultimate length 60 of the second tether 18B is longer, the orientation of the top end cap 12 changes. As the first tether 18A cannot stretch further, the first side 28 of the top end cap 12 is held stationary. The second tether 18B stretches and allows the second side 30 of the top end cap 12 to move further away from the bottom end cap 14, and thus, the top end cap 12 tilts toward the first side 28. At this point, when the internal pressure within the bladder 16 is nine psi, the second tether 18B has been stretched to its' ultimate length 60, and cannot stretch further.

The inflatable structure, as shown in FIG. 1E, provides a final support profile 26F that is capable of supporting a compressive load. Due to the elasticity of the first and second tethers 18A, 18B, nine psi of pressure within the bladder 16 is required to force the bladder 16 to expand to the final support profile 26F, and thus, the pressurized bladder 16 is capable of providing support for a compressive load, as indicated by arrow 62. The amount of compressive load that the inflatable structure 10 can support in the final support profile 26F is higher than the amount of compressive load that the inflatable structure 10 can support in the first and second intermediary support profiles 26IA, 26IB due to the increase in the internal pressure of the bladder 16.

Referring to FIG. 2, as the pressure increases from seven psi 52 to nine psi 64, the length of the first tether 18A does not change as the pressure increases, as indicated by line segment 66, and the second tether 18B increases from the second length 54 to a third length 68, as indicated by line segment 70. It should be noted that the second length 54 is equal to the ultimate length 58 of the first tether 18A, and the third length 68 is equal to the ultimate length 60 of the second tether 18B. The pressure within the bladder 16 may be increased further, beyond nine psi, resulting in no change to the final support profile 26F, but increasing the amount of compressive load the inflatable structure 10 can support.

Figures 3A, 3B, 3C, 3D, 4A:
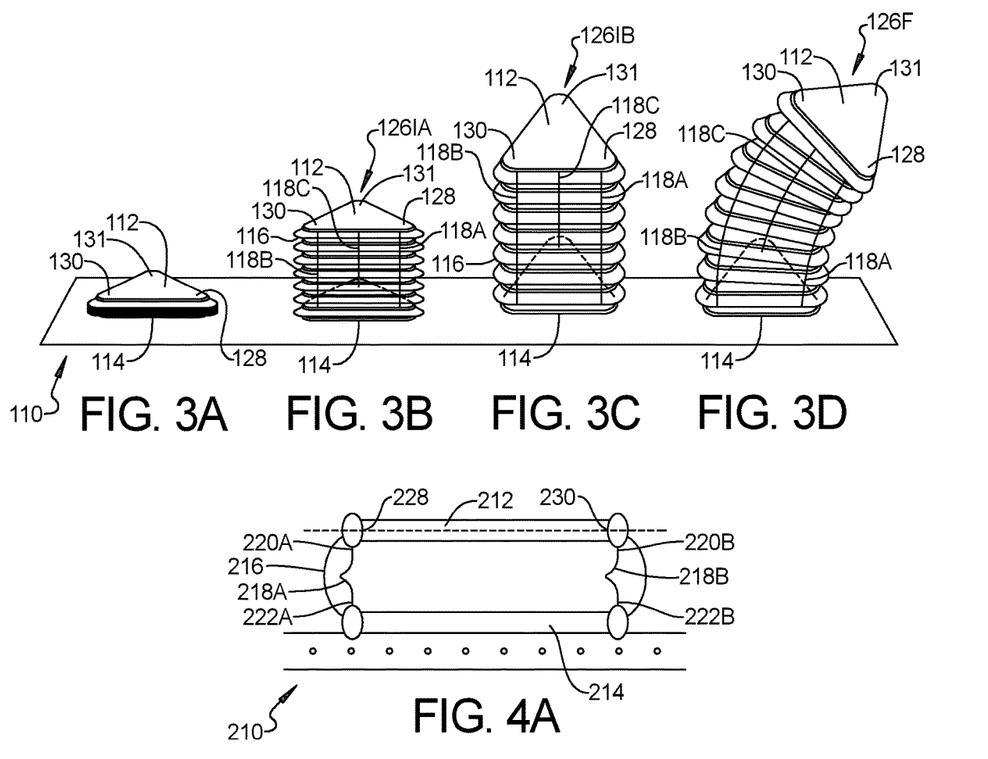
FIG. 3A is a schematic view of an inflatable structure in accordance with an exemplary embodiment including first, second and third tethers that have equal stiffness and different ultimate lengths.
FIG. 3B is a schematic view of the inflatable structure shown in FIG. 3A, wherein the bladder is pressurized to five psi.
FIG. 3C is a schematic view of the inflatable structure shown in FIG. 3A, wherein the bladder is pressurized to seven psi.
FIG. 3D is a schematic view of the inflatable structure shown in FIG. 3A, wherein the bladder is pressurized to ten psi.
FIG. 4A is a schematic view of an inflatable structure in accordance with an exemplary embodiment including first and second tethers that have different stiffness and equal ultimate lengths.

Referring to FIG. 3A, in another exemplary embodiment, an inflatable structure 110 includes a top end cap 112, a bottom end cap 114, a bladder 116 attached to the top and bottom end caps 112, 114 and a first tether 118A attached to an inner surface of the top end cap 12 at a first corner 128, a second tether 118B attached to an inner surface of the top end cap 112 at a second corner 130, and a third tether 118C attached to an inner surface of the top end cap 112 at a third corner 131. In an exemplary embodiment, each of the first, second and third tethers 118A, 118B, 118C is elastic.

Referring again to FIG. 3A, the inflatable structure 110 is shown wherein the pressure within the bladder 116 is zero psi. Referring to FIG. 3B, the inflatable structure 110 is shown wherein the pressure within the bladder 116 is five psi. In an exemplary embodiment, each of the first, second and third tethers 118A, 118B, 118C are elastic and have an equal stiffness. As shown, five psi is sufficient to overcome the stiffness of each of the first, second and third tethers 118A, 118B, 118C and each of the first, second and third tethers 118A, 118B, 118C begins to stretch. Because the stiffness of the first, second and third tethers 118A, 118B, 118C is equal, they stretch equally, and thus, the orientation of the top end cap 112 remains flat, as shown in FIG. 3B. The inflatable structure 110, as shown in FIG. 3B, provides a first intermediary support profile 126IA that is capable of supporting a compressive load. Due to the elasticity of the first, second and third tethers 118A, 118B, 118C, five psi of pressure within the bladder 116 is required to force the bladder 116 to expand to the first intermediary support profile 126IA, and thus, the pressurized bladder 116 is capable of providing support for a compressive load.

Referring to FIG. 3C, the inflatable structure 110 is shown wherein the pressure within the bladder 116 is seven psi, which is sufficient to further stretch each of the first, second and third tethers 118A, 118B, 118C. As shown, the first and second tethers 118A, 118B have a higher stiffness than the third tether 118C, and thus, the third tether 118C stretches further than the first and second tethers 118A, 118B when the pressure within the bladder 116 is seven psi. The additional stretching of the third tether 118C allows the third corner 131 of the top end cap 112 to move further away from the bottom end cap 114, and thus tilting the top end cap 112 forward, as shown in FIG. 3C. The inflatable structure 110, as shown in FIG. 3C, provides a second intermediary support profile 126IB that is capable of supporting a compressive load. In an exemplary embodiment, the inflatable structure 110 is used to support an object at a usable position for a passenger within a vehicle. The tilting of the second intermediary support profile 126IB may be used to orient such object for proper positioning relative to the passenger within the vehicle.

At this point, when the internal pressure within the bladder 116 is seven psi, the first tether 118A and the third tether 118C have been stretched to their ultimate length, and cannot be stretched further. Referring to FIG. 3D, the inflatable structure 110 is shown wherein the pressure within the bladder 116 is ten psi, which is sufficient to further stretch the second tether 118B. Because the ultimate length of the second tether 118B is longer than the first and third tethers 118A, 118C, the orientation of the top end cap 112 again changes. As the first tether 118A cannot stretch further, the first corner 128 of the top end cap 112 is held stationary. As the third tether 118C cannot stretch further, the third corner 131 of the top end cap 112 is held stationary. The second tether 1186 stretches and allows the second corner 130 of the top end cap 112 to move further away from the bottom end cap 114, and due to the first and third corners 128, 131 being held stationary, causes the top end cap 112 to tilt toward the first corner 128. At this point, when the internal pressure within the bladder 116 is ten psi, the second tether 118B, along with the first and third tethers 118A, 118C, has been stretched to its' ultimate length, and cannot stretch further. The inflatable structure 110, as shown in FIG. 3D, provides a final support profile 126F that is capable of supporting a compressive load.

In one exemplary embodiment, all of the plurality of tethers have an equal ultimate length, and at least one of the plurality of tethers has a stiffness that is different than a stiffness of the remaining of the plurality of tethers. Referring to FIG. 4A, an inflatable structure 210 includes a top end cap 212, a bottom end cap 214, a bladder 216 attached to the top and bottom end caps 212, 214, a first tether 218A disposed within the bladder 216 having a first end 220A attached to a first side 228 of the top end cap 212 and a second end 222A attached to the bottom end cap 214, and a second tether 218B disposed within the bladder 216 having a first end 220B attached to a second side 230 of the top end cap 212 and a second end 222B attached to the bottom end cap 214. In an exemplary embodiment, each of the first and second tethers 218A, 218B is elastic.

Figures 4B, 4C, 4D, 4E:
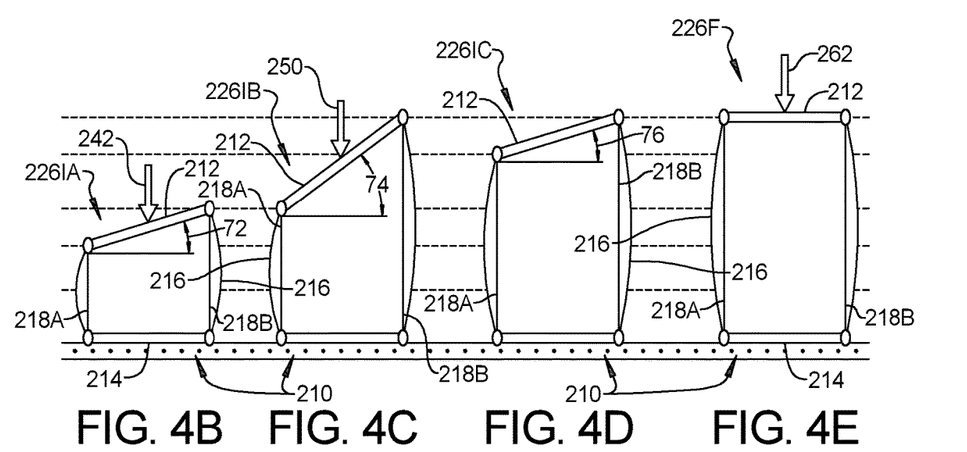
FIG. 4B is a schematic view of the inflatable structure shown in FIG. 4A, wherein the bladder is pressurized to four psi.
FIG. 4C is a schematic view of the inflatable structure shown in FIG. 4A, wherein the bladder is pressurized to five psi.
FIG. 4D is a schematic view of the inflatable structure shown in FIG. 4A, wherein the bladder is pressurized to seven psi.
FIG. 4E is a schematic view of the inflatable structure shown in FIG. 4A, wherein the bladder is pressurized to eight psi.
Figure 5:
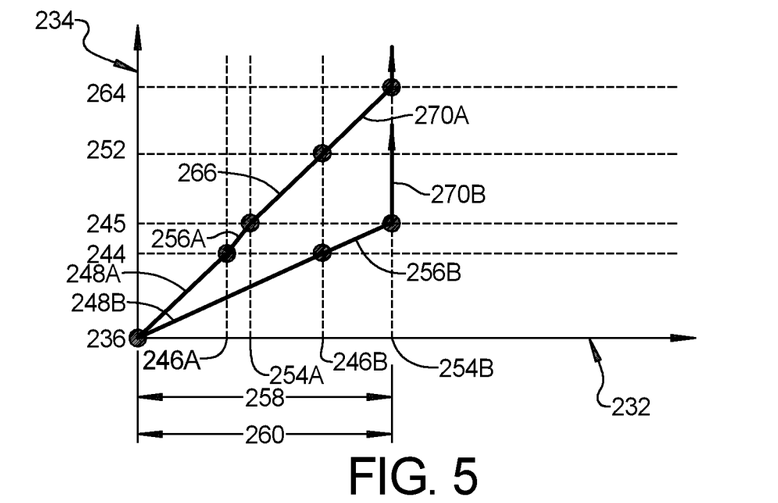
FIG. 5 is a graph plotting the length of the first and second tethers vs. the pressure within the bladder for the inflatable structure shown in FIG. 4A.

Referring to FIG. 5, a graph having an x-axis 232 representing the length of the first and second tethers 218A, 218B, and a y-axis 234 representing the pressure within the bladder 216 is shown. Referring again to FIG. 4A, the inflatable structure 210 is shown wherein the pressure within the bladder 216 is zero psi. Referring to FIG. 4B, the inflatable structure 210 is shown wherein the pressure within the bladder 216 is four psi. In an exemplary embodiment, the first tether 218A has a stiffness that is higher than a stiffness of the second tether 218B. As shown, four psi is sufficient to overcome the stiffness of each of the first and second tethers 218A, 218B, and each of the first and second tethers 218A, 218B begins to stretch. Because the stiffness of the first tether 218A is higher than the stiffness of the second tether 218B, the second tether 218B stretches more than the first tether 218A, causing the second side 230 of the top end cap 212 to raise up away from the bottom end cap 214 further than the first side 228 of the top end cap 212, and thus, the top end cap 212 tilts toward the first side 228.

The inflatable structure 210, as shown in FIG. 4B, provides a first intermediary support profile 226IA that is capable of supporting a compressive load. Due to the different stiffness, and corresponding different elasticity of the first and second tethers 218A, 218B, the first intermediary support profile 226IA positions the top end cap 212 at a first angle 72 relative to the bottom end cap 214. Due to the elasticity of the first and second tethers 218A, 218B, four psi of pressure within the bladder 216 is required to force the bladder 216 to expand to the first intermediary support profile 226IA, and thus, the pressurized bladder 216 is capable of providing support fora compressive load, as indicated by arrow 242. Referring to FIG. 5, as the pressure increases from zero psi 236, to four psi 244, the length of the first tether 218A increases from zero to a first length 246A, as indicated by line segment 248A, and the length of the second tether 218B increases from zero to a second length 246B, as indicated by line segment 248B.

Referring to FIG. 4C, the inflatable structure 210 is shown wherein the pressure within the bladder 216 is five psi, which is sufficient to further stretch each of the first and second tethers 218A, 218B. Because the stiffness of the first tether 218A is higher than the stiffness of the second tether 218B, the second tether 218B stretches more than the first tether 218B, causing the second side 230 of the top end cap 212 to raise up away from the bottom end cap 214 further than the first side 228 of the top end cap 212. The inflatable structure 210, as shown in FIG. 4C, provides a second intermediary support profile 226IB that is capable of supporting a compressive load. Due to the different stiffness, and corresponding different elasticity of the first and second tethers 218A, 218B, the second intermediary support profile 226IB positions the top end cap 212 at a second angle 74, larger than the first angle 72, relative to the bottom end cap 214.

Due to the elasticity of the first and second tethers 218A, 218B, five psi of pressure within the bladder 216 is required to force the bladder 216 to expand to the second intermediary support profile 226IB, and thus, the pressurized bladder 216 is capable of providing support for a compressive load, as indicated by arrow 250. The amount of compressive load that the inflatable structure 210 can support in the second intermediary support profile 226IB is higher than the amount of compressive load that the inflatable structure 210 can support in the first intermediary support profile 226IA due to the increase in the internal pressure of the bladder 216. Referring to FIG. 5, as the pressure increases from four psi 244, to five psi 245, the length of the first tether 218A increases from the first length 246A to a third length 254A, as indicated by line segment 256A, and the second tether 218B increases from the second length 246B to a fourth length 254B, as indicated by line segment 256B.

At this point, when the internal pressure within the bladder 216 is five psi, the second tether 218B has been stretched to its' ultimate length 260, and cannot be stretched further. The ultimate length 260 of the second tether 218B is equal to the fourth length 254B. Referring to FIG. 4D, the inflatable structure 210 is shown wherein the pressure within the bladder 216 is seven psi, which is sufficient to further stretch the first tether 218A, allowing the first side 228 of the top end cap 212 to move further away from the bottom end cap 214. Because the second tether 218B is stretched to its' ultimate length 260, the second side 230 of the top end cap 212 is held stationary. As the first tether 218A stretches further, the orientation of the top end cap 212 once again changes. The inflatable structure 210, as shown in FIG. 4D, provides a third intermediary support profile 226IC that is capable of supporting a compressive load. Due to the different stiffness, and corresponding different elasticity of the first and second tethers 218A, 218B, the third intermediary support profile 226IC positions the top end cap 212 at a third angle 76, smaller than the second angle 74, relative to the bottom end cap 214. Referring to FIG. 5, as the pressure increases from five psi 245, to seven psi 252, the length of the first tether 218A increases from the third length 254A to the second length 246B, as indicated by line segment 266. The second tether 218B does not increase in length.

Referring to FIG. 4E, the inflatable structure 210 is shown wherein the pressure within the bladder 216 is eight psi, which is sufficient to further stretch the first tether 218A, allowing the first side 228 of the top end cap 212 to move further away from the bottom end cap 214. Because the second tether 218B is already stretched to its' ultimate length 260, the second side 230 of the top end cap 212 is held stationary. As the first tether 218A stretches further, the orientation of the top end cap 212 once again changes. At this point, when the internal pressure within the bladder 216 is eight psi, both the first and second tethers 218A, 218B have been stretched to their ultimate length 258, 260, and cannot stretch further.

The inflatable structure 210 as shown in FIG. 4E, provides a final support profile 226F that is capable of supporting a compressive load. Due to the elasticity of the first and second tethers 218A, 218B, eight psi of pressure within the bladder 216 is required to force the bladder 216 to expand to the final support profile 226F, and thus, the pressurized bladder 216 is capable of providing support for a compressive load, as indicated by arrow 262. The amount of compressive load that the inflatable structure 210 can support in the final support profile 226F is higher than the amount of compressive load that the inflatable structure can support in the first, second or third intermediary support profiles 226IA, 226IB, 226IC due to the increase in the internal pressure of the bladder 216. Because the ultimate lengths 258, 260 of the first and second tethers 218A, 218B are equal, the top end cap 212 is oriented flat when the inflatable structure 210 is in the final support profile 226F.

It should be understood, that the inflatable structure 210 shown in FIG. 4A through FIG. 4E, may provide other suitable intermediate support profiles. As the bladder 216 is inflated from zero psi to eight psi, the orientation of the top end cap 212 is continuously changing. Inflating the bladder 216 to any pressure between zero and eight psi will result in the inflatable structure 210 presenting a usable intermediary support structure wherein the top end cap 212 is oriented between zero degrees and the second angle 74, and the inflatable structure is capable of supporting a compressive load.

Referring to FIG. 5, as the pressure increases from seven psi 252 to eight psi 264, the length of the second tether 218B does not change as the pressure increases, as indicated by line segment 270B, and the first tether 218A increases from the second length 246B to the ultimate length 258 of the first tether 218A, as indicated by line segment 270A. The pressure within the bladder 216 may be increased further, beyond eight psi, resulting in no change to the final support profile 226F, but increasing the amount of compressive load the inflatable structure 210 can support.

Figure 6A:
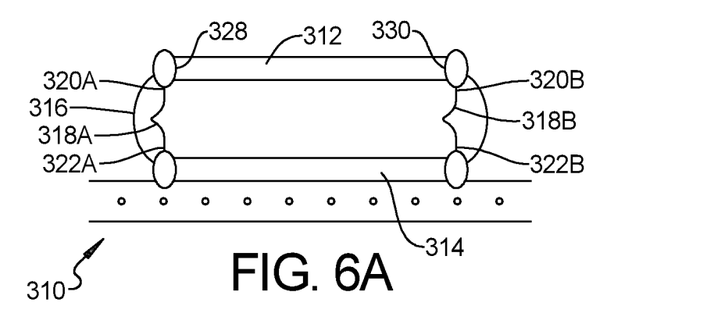
FIG. 6A is a schematic view of an inflatable structure in accordance with an exemplary embodiment including first and second tethers that have equal stiffness and equal ultimate lengths.

In an exemplary embodiment, all of the plurality of tethers have an equal ultimate length and an equal stiffness. Referring to FIG. 6A, an inflatable structure 310 includes a top end cap 312, a bottom end cap 314, a bladder 316 attached to the top and bottom end caps 312, 314, a first tether 318A disposed within the bladder 316 having a first end 320A attached to a first side 328 of the top end cap 312 and a second end 322A attached to the bottom end cap 314, and a second tether 318B disposed within the bladder 316 having a first end 320B attached to a second side 330 of the top end cap 312 and a second end 322B attached to the bottom end cap 314. The first and second tether 318A, 318B have equal ultimate lengths and the first and second tethers 318A, 318B have equal stiffness.

Figure 6B:
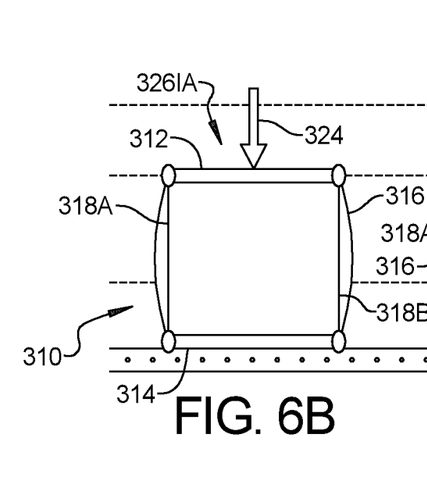
FIG. 6B is a schematic view of the inflatable structure shown in FIG. 6A, wherein the bladder is pressurized to five psi.

Referring again to FIG. 6A, the inflatable structure 310 is shown wherein the pressure within the bladder 316 is zero psi. Referring to FIG. 6B, the inflatable structure 310 is shown wherein the pressure within the bladder 316 is five psi. As shown, five psi is sufficient to overcome the stiffness of each of the first and second tethers 318A, 318B, and each of the first and second tethers 318A, 318B begins to stretch. Because the stiffness of the first tether 318A and the stiffness of the second tether 318B are equal, the first and second tethers 318A, 318B stretch at the same rate, and the orientation of the top end cap 312 remains flat. The inflatable structure, as shown in FIG. 6B, provides a first intermediary support profile 326IA that is capable of supporting a compressive load. Due to the elasticity of the first and second tethers 318A, 318B, five psi of pressure within the bladder 316 is required to force the bladder 316 to expand to the first intermediary support profile 326IA, and thus, the pressurized bladder 316 is capable of providing support for a compressive load, as indicated by arrow 324.

Figure 6C:
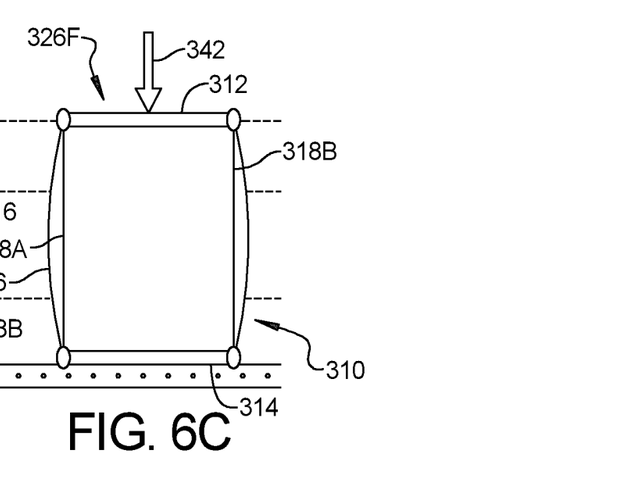
FIG. 6C is a schematic view of the inflatable structure shown in FIG. 6A, wherein the bladder is pressurized to ten psi.

Referring to FIG. 6C, the inflatable structure 310 is shown wherein the pressure within the bladder 316 is ten psi, which is sufficient to further stretch each of the first and second tethers 318A, 318B. Because the stiffness of the first tether 318A and the stiffness of the second tether 318B are equal, the first and second tethers 318A, 318B stretch at the same rate, and the orientation of the top end cap 312 remains flat. At ten psi, each of the first and second tethers 318A, 318B are stretched to their ultimate length, and cannot stretch further. The inflatable structure 310, as shown in FIG. 6C, provides a final support profile 326F that is capable of supporting a compressive load.

Due to the elasticity of the first and second tethers 318A, 318B, ten psi of pressure within the bladder 316 is required to force the bladder 316 to expand to the final support profile 326F, and thus, the pressurized bladder 316 is capable of providing support for a compressive load, as indicated by arrow 342. The amount of compressive load that the inflatable structure 310 can support in the final support profile 326F is higher than the amount of compressive load that the inflatable structure 310 can support in the first intermediary support profile 326IA due to the increase in the internal pressure of the bladder 316. The pressure within the bladder 316 may be increased further, beyond ten psi, resulting in no change to the final support profile 326F, but increasing the amount of compressive load the inflatable structure 310 can support. Because the stiffness of the first and second tethers 318A, 318B is equal, the top end cap 312 of the inflatable structure 310 remains flat throughout inflation from zero to the final support profile 326F and any intermediary support profiles 326IA therebetween.

Figure 7A:
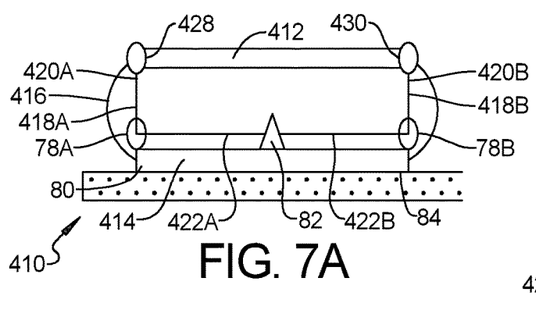
FIG. 7A is a schematic view of an inflatable structure in accordance with an exemplary embodiment including first and second tethers that are pre-tensioned.

In an exemplary embodiment, all of the plurality of tethers have an equal ultimate length and an equal stiffness and at least one of the plurality of tethers is pre-tensioned. Referring to FIG. 7A, an inflatable structure 410 includes a top end cap 412, a bottom end cap 414, a bladder 416 attached to the top and bottom end caps 412, 414, a first tether 418A disposed within the bladder 416 having a first end 420A attached to a first side 428 of the top end cap 412 and a second end 422A attached to the bottom end cap 414, and a second tether 418B disposed within the bladder 416 having a first end 420B attached to a second side 430 of the top end cap 412 and a second end 422B attached to the bottom end cap 414. The first and second tether 418A, 418B have equal ultimate lengths and the first and second tethers 418A, 418B have equal stiffness. The first tether 418A passes through a first loop 78A positioned adjacent a first side 80 of the bottom end cap 414, and the second end 422A of the first tether 418A is attached to an anchor point 82 near the center of the bottom end cap 414. When there is no pressure within the bladder 416, the first tether 418A is stretched between the first side 428 of the top end cap 412 and the anchor point 82 such that the first tether 418A is pre-tensioned. The second tether 418B passes through a second loop 78B positioned adjacent a second side 84 of the bottom end cap 414, and the second end 422B of the second tether 418B is attached to the anchor point 82 near the center of the bottom end cap 414. When there is no pressure within the bladder 416, the second tether 418B is stretched between the second side 430 of the top end cap 412 and the anchor point 82 such that the second tether 418B is pre-tensioned.

Figures 7B, 7C:
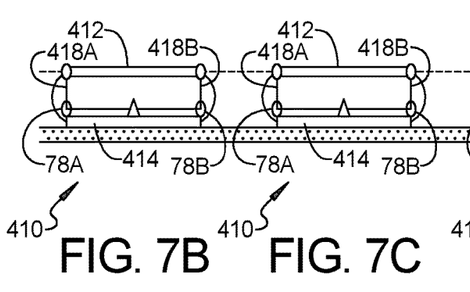
FIG. 7B is a schematic view of the inflatable structure shown in FIG. 7A, wherein the bladder is pressurized to one psi.
FIG. 7C is a schematic view of the inflatable structure shown in FIG. 7A, wherein the bladder is pressurized to five psi.

Referring again to FIG. 7A, the inflatable structure 410 is shown wherein the pressure within the bladder 416 is zero psi. Referring to FIG. 7B, the inflatable structure 410 is shown wherein the pressure within the bladder 416 is one psi. Because the first and second tethers 418A, 418B are pre-stretched, one psi is not sufficient to overcome the pre-tension within the first and second tethers 418A, 418B, and neither of the first and second tethers 418A, 418B begins to stretch. Referring to FIG. 7C, the inflatable structure 410 is shown wherein the pressure within the bladder 416 is five psi. Because the first and second tethers 418A, 418B are pre-stretched, five psi is not sufficient to overcome the pre-tension within the first and second tethers 418A, 418B, and neither of the first and second tethers 418A, 418B begins to stretch.

Figures 7D, 7E:
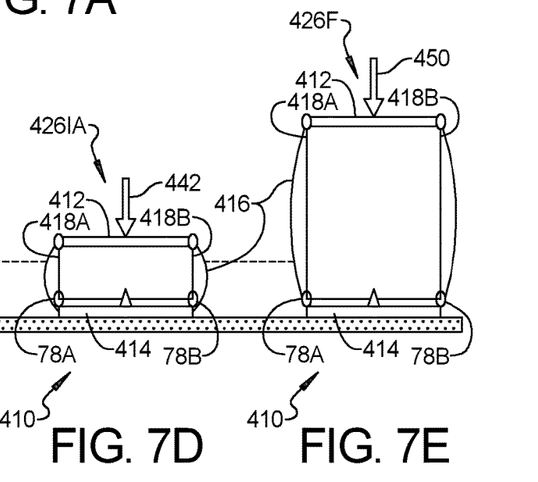
FIG. 7D is a schematic view of the inflatable structure shown in FIG. 7A, wherein the bladder is pressurized to greater than seven psi.
FIG. 7E is a schematic view of the inflatable structure shown in FIG. 7A, wherein the bladder is pressurized to nine psi.

Referring to FIG. 7D, the inflatable structure 410 is shown wherein the pressure within the bladder 416 is slightly more than seven psi. Because the first and second tethers 418A, 418B are pre-stretched, neither of the first and second tethers 418A, 418B begin to stretch further until the pressure within the bladder 416 is seven psi. At seven psi, the pressure within the bladder 416 is sufficient to overcome the pre-tension in each of the first and second tethers 418A, 418B, and the first and second tethers 418A, 418B begin to stretch, as shown in FIG. 7D. Because the stiffness of the first tether 418A and the stiffness of the second tether 418B are equal, the first and second tethers 418A, 418B stretch at the same rate, and the orientation of the top end cap 412 remains flat. The inflatable structure 410, as shown in FIG. 7D, provides a first intermediary support profile 426IA that is capable of supporting a compressive load. Due to the elasticity of the first and second tethers, at least seven psi of pressure within the bladder 416 is required to force the bladder 416 to expand to an intermediary support profile, and thus, the pressurized bladder 416 is capable of providing support for a compressive load, as indicated by arrow 442.

Figure 8:
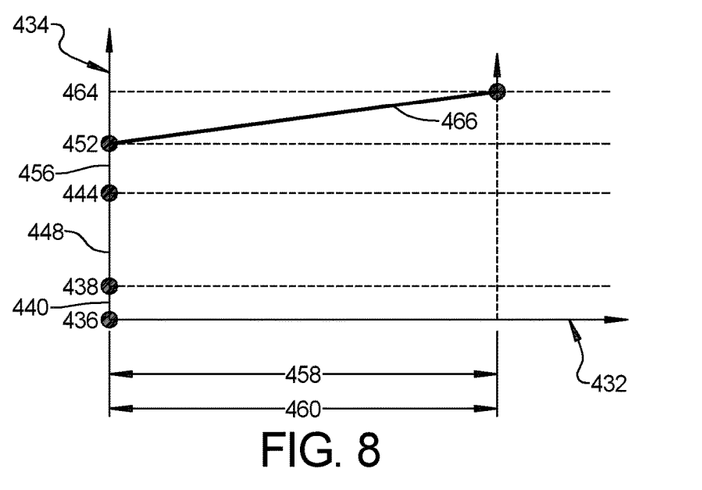
FIG. 8 is a graph plotting the length of the first and second tethers vs. the pressure within the bladder for the inflatable structure shown in FIG. 7A.

Referring to FIG. 8, a graph having an x-axis 432 representing the length of the first and second tethers 418A, 418B, and a y-axis 434 representing the pressure within the bladder 416 is shown. As the pressure within the bladder 416 increases from zero psi 436 to one psi 438, as indicated by line segment 440, and then to five psi 444, as indicated by line segment 448, and then to seven psi 452, as indicated by line segment 456, the length of the first and second tethers 418A, 418B does not increase.

Referring to FIG. 7E, the inflatable structure 410 is shown wherein the pressure within the bladder 416 is nine psi. Because the stiffness of the first tether 418A and the stiffness of the second tether 418B are equal, the first and second tethers 418A, 418B stretch at the same rate, and the orientation of the top end cap 412 remains flat. At this point, when the pressure within the bladder 416 is nine psi, each of the first and second tethers 418A, 418B have been stretched to their ultimate length, and cannot stretch further. The inflatable structure 410, as shown in FIG. 7E, provides a final support profile 426F that is capable of supporting a compressive load. Due to the elasticity of the first and second tethers 418A, 418B, nine psi of pressure within the bladder 416 is required to force the bladder 416 to expand to the final intermediary support profile 426F, and thus, the pressurized bladder 416 is capable of providing support for a compressive load, as indicated by arrow 450. The amount of compressive load that the inflatable structure 410 can support in the final support profile 426F is higher than the amount of compressive load that the inflatable structure 410 can support in the first intermediary support profile 426IA due to the increase in the internal pressure of the bladder 416.

Referring again to FIG. 8, as the pressure within the bladder 416 increases from seven psi 452 to nine psi 464, as indicated by line segment 466, the length of the first tether 418A increases to the ultimate length 458 of the first tether 418A, and the length of the second tether 418B increases to the ultimate length 460 of the second tether 418B. The pressure within the bladder 416 may be increased further, beyond nine psi, resulting in no change to the final support profile 426F, but increasing the amount of compressive load the inflatable structure 410 can support. Because the stiffness of the first tether 418A and the stiffness of the second tether 4186 are equal, the first and second tethers 418A, 4186 stretch at the same rate, and the orientation of the top end cap 412 remains flat throughout expansion of the bladder 416. The ultimate lengths 458, 460 of the first and second tethers 418A, 4186 are equal, so when the inflatable structure 410 is in the final support profile 426F, as shown in FIG. 7E, the orientation of the top end cap 412 remains flat.

Figure 9A:
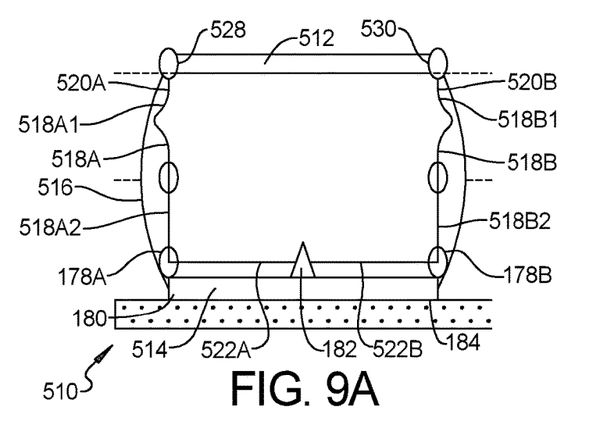
FIG. 9A is a schematic view of an inflatable structure in accordance with an exemplary embodiment including first and second tethers that each include first and second segments attached end to end.

In another exemplary embodiment, the at least one elastic tether includes a first tether segment and a second tether segment, the first and second tether segments attached to one another end to end. Referring to FIG. 9A, an inflatable structure 510 includes a top end cap 512, a bottom end cap 514, a bladder 416 attached to the top and bottom end caps 512, 514, a first tether 518A disposed within the bladder 516 having a first end 520A attached to a first side 528 of the top end cap 512 and a second end 522A attached to the bottom end cap 514, and a second tether 518B disposed within the bladder 516 having a first end 520B attached to a second side 530 of the top end cap 512 and a second end 522B attached to the bottom end cap 514.

The first tether 518A includes a first segment 518A1 and a second segment 518A2 attached to one another end to end, in series. The second tether 518B includes a first segment 518B1 and a second segment 518B2 attached to one another end to end, in series. In various embodiments, either one or both of the first and second tethers 518A, 518B may be elastic. As shown in FIG. 9A, each of the first and second tethers 518A, 518B is elastic. In various embodiments, either or both of the first and second segments 518A1, 518A2, 518B1, 518B2 of the first and second tethers 518A, 518B may be elastic. As shown in FIG. 9A, each of the first and second segments 518A1, 518A2, 518B1, 518B2 of each of the first and second tethers 518A, 518B is elastic.

In various embodiments, the first segment 518A1, 518B1 and the second segment 518B1, 518B2 of each of the first and second tethers 518A, 518B may have different stiffness from one another. As shown, the first segment 518A1 of the first tether 518A has a different stiffness than the second segment 518A2 of the first tether 518A, and the first segment 518B1 of the second tether 518B has a different stiffness than the second segment 518B2 of the second tether 518B. In various embodiments, the first segments 518A1, 518B1 and the second segments 518A2, 518B2 of each of the first and second tethers 518A, 518B may have different ultimate lengths from one another. As shown, the first segment 518A1 of the first tether 518A has a different ultimate length than the second segment 518A2 of the first tether 518A, and the first segment 518B1 of the second tether 518B has a different ultimate length than the second segment 518B2 of the second tether 518B. Further, as shown in FIG. 9A-FIG. 9E, the ultimate length of the first tether 518A is the same as the ultimate length of the second tether 518B.

In an exemplary embodiment, the second segment 518A2 of the first tether 518A and the second segment 518B2 of the second tether 518B are pre-tensioned. The second segment 518A2 of the first tether 518A passes through a first loop 178A positioned adjacent a first side 180 of the bottom end cap 514, and the second end 522A of the first tether 518A is attached to an anchor point 182 near the center of the bottom end cap 514. When there is no pressure within the bladder 516, the second segment 518A2 of the first tether 518A is stretched such that the second segment 518A2 of the first tether 518A is pre-tensioned. The second segment 518B2 of the second tether 518B passes through a second loop 178B positioned adjacent a second side 184 of the bottom end cap 514, and the second end 522B of the second tether 518B is attached to the anchor point 182 near the center of the bottom end cap 514. When there is no pressure within the bladder 516, the second segment 518B2 of the second tether 518B is stretched such that the second segment 518B2 of the second tether 518B is pre-tensioned.

Figure 9B:
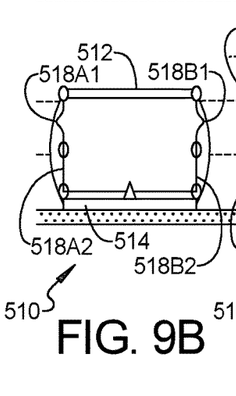
FIG. 9B is a schematic view of the inflatable structure shown in FIG. 9A, wherein the bladder is pressurized to one psi.
Figure 9C:
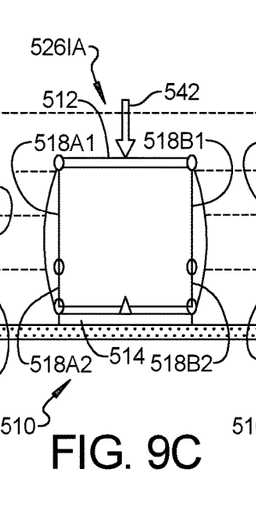
FIG. 9C is a schematic view of the inflatable structure shown in FIG. 9A, wherein the bladder is pressurized to five psi.

Referring again to FIG. 9A, the inflatable structure 510 is shown wherein the pressure within the bladder 516 is zero psi. Referring to FIG. 9B, the inflatable structure 510 is shown wherein the pressure within the bladder is one psi. One psi is not sufficient to overcome the pre-tension within the second segments 518A2, 518B2 of the first and second tethers 518A, 518B or the stiffness of the first segments 518A1, 518B1 of the first and second segments 518A, 518B, and neither of the first and second tethers 518A, 518B begins to stretch, and the top end cap 512 does not move. Referring to FIG. 9C, the inflatable structure 510 is shown wherein the pressure within the bladder 516 is five psi. At five psi, the pressure within the bladder 516 is sufficient to overcome the stiffness of the first segments 518A1, 518B1 of the first and second tethers 518A, 518B, and the first segments 518A1, 518B1 of the first and second segments 518A, 518B begin to stretch. Because the stiffness of the first segment 518A1 of the first tether 518A and the stiffness of the first segment 518B1 of the second tether 518B are equal, the first segments 518A1, 518B1 of the first and second tethers 518A, 518B stretch at the same rate, and the orientation of the top end cap 512 remains flat.

Figure 10:
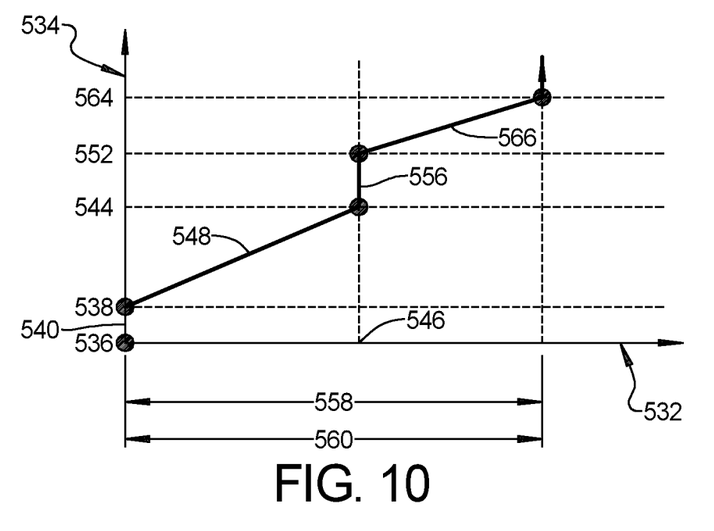
FIG. 10 is a graph plotting the length of the first and second tethers vs. the pressure within the bladder for the inflatable structure shown in FIG. 9A.

Referring to FIG. 10, a graph having an x-axis 532 representing the length of the first and second tethers 518A, 518B, and a y-axis 534 representing the pressure within the bladder 516 is shown. As the pressure within the bladder 516 increases from zero psi 536 to one psi 538, as indicated by line segment 540, the length of the first and second tethers 518A, 518B does not increase. As the pressure within the bladder 516 increases from one psi 538 to five psi 544, as indicated by line segment 548, the first segments 518A1, 518B1 of the first and second tethers 518A, 518B stretch, and, at five psi 544, the length of the first and second tethers 518A, 518B increases to a first length 546.

The inflatable structure, as shown in FIG. 9C, provides a first intermediary support profile 526IA that is capable of supporting a compressive load. Due to the elasticity of the first and second tethers, five psi of pressure within the bladder 516 is required to force the bladder 516 to expand to the first intermediary support profile 526IA, and thus, the pressurized bladder 516 is capable of providing support for a compressive load, as indicated by arrow 542. At this point, when the pressure within the bladder 516 is five psi, the first segments 518A1, 518B1 of each of the first and second tethers 518A, 518B have been stretched to their ultimate length, and cannot stretch further.

Figure 9D:
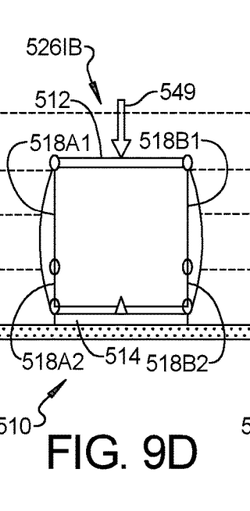
FIG. 9D is a schematic view of the inflatable structure shown in FIG. 9A, wherein the bladder is pressurized to greater than seven psi.

Referring to FIG. 9D, the inflatable structure 510 is shown wherein the pressure within the bladder 516 is seven psi. At seven psi, the pressure within the bladder 516 is not sufficient to overcome the pre-tension within the second segments 518A2, 518B2 of the first and second tethers 518A, 518B, and the first segments 518A1, 518B1 of the first and second tethers 518A, 518B are stretched to their ultimate lengths, thus, the top end cap 512 of the inflatable structure 510 does not move further away from the bottom end cap 514. The inflatable structure, as shown in FIG. 9D, provides the first intermediary support profile 526IA, however, the pressure within the bladder 516 has been increased from five psi to seven psi, thus increasing the amount of compressive load 549 that the inflatable structure 510 is capable of supporting.

Referring again to FIG. 10, as the pressure within the bladder 516 increases from five psi 544 to seven psi 552, as indicated by line segment 556, the length of the first and second tethers 518A, 518B does not increase.

Figure 9E:
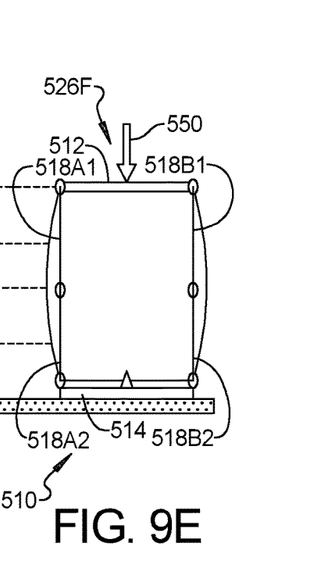
FIG. 9E is a schematic view of the inflatable structure shown in FIG. 9A, wherein the bladder is pressurized to nine psi.

Referring to FIG. 9E, the inflatable structure 510 is shown wherein the pressure within the bladder 516 is nine psi. At nine psi, the pressure within the bladder 516 is sufficient to overcome the pre-tension in the second segments 518A2, 518B2 of each of the first and second tethers 518A, 518B, and the second segments 518A2, 518B2 of the first and second tethers 518A, 518B begin to stretch. Because the stiffness of the second segment 518A2 of the first tether 518A and the stiffness of the second segment 518B2 of the second tether 518B are equal, the second segments 518A2, 518B2 of the first and second tethers 518A, 518B stretch at the same rate, and the orientation of the top end cap 512 remains flat. At this point, when the pressure within the bladder 516 is nine psi, each of the second segments 518A2, 518B2 of the first and second tethers 518A, 518B have been stretched to their ultimate length, and thus, each of the first and second tethers 518A, 518B has been stretched to their ultimate length 558, 560, and cannot stretch further.

The inflatable structure 510, as shown in FIG. 9E, provides a final support profile 526F that is capable of supporting a compressive load. Due to the elasticity of the first and second tethers 518A, 518B, nine psi of pressure within the bladder 516 is required to force the bladder 516 to expand to the final intermediary support profile 526F, and thus, the pressurized bladder 516 is capable of providing support for a compressive load, as indicated by arrow 550. The amount of compressive load that the inflatable structure 510 can support in the final support profile 526F is higher than the amount of compressive load that the inflatable structure 510 can support in the first intermediary support profile 526IA at five psi or seven psi, due to the increase in the internal pressure of the bladder 516 to nine psi.

Referring again to FIG. 10, as the pressure within the bladder 516 increases from seven psi 552 to nine psi 564, as indicated by line segment 566, the length of the first tether 518A increases to its' ultimate length 558, and the length of the second tether 518B increases to its' ultimate length 560, which is equal to the ultimate length 558 of the first tether 518A. The pressure within the bladder 516 may be increased further, beyond nine psi, resulting in no change to the final support profile 526F, but increasing the amount of compressive load the inflatable structure 510 can support.

An inflatable structure of the present disclosure offers several advantages. These include providing an inflatable structure that is capable of supporting compressive loads not only when the inflatable structure is fully inflated and presents a final support profile, but also when the inflatable device is partially inflated and presents one of a plurality of intermediary support profiles. In addition, by utilizing different combinations of elastic and in-elastic tethers, tethers with varying stiffness and tethers of varying ultimate length, the orientation of a top end cap can be tailored for specific uses, such as deployment of aerodynamic features, mirrors, or other external features of an automobile, as well as providing support structures for objects to be utilized by a passenger within an automobile.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. An inflatable structure comprising:
   a top end cap;
   a bottom end cap;
   a bladder attached to the top and bottom end caps and configured to hold pressurized air between the top and bottom end caps;
   a plurality of tethers disposed within the bladder, each tether in the plurality of tethers having a first end coupled to the top end cap and a second end coupled to the bottom end cap, wherein when the bladder is inflated, the bladder expands axially forcing the top end cap and the bottom end cap away from one another, the plurality of tethers adapted to restrict movement of the top end cap and the bottom end cap away from one another and limit axial expansion of the bladder, at least one of the plurality of tethers having an ultimate length that is different than an ultimate length of the remaining of the plurality of tethers;

wherein, at least one of the plurality of tethers is elastic, and the inflatable structure is adapted to provide multiple support profiles that are capable of supporting compressive loading.

2. The inflatable structure of claim 1, wherein the inflatable structure includes a final support profile, wherein all of the plurality of tethers are extended to an ultimate length, and at least one intermediate support profile, wherein at least one of the plurality of tethers is not extended to an ultimate length.

3. The inflatable structure of claim 2, wherein the at least one elastic tether comprises one of:
an elastic band;
a spring; and
an elastic core surrounded by an inelastic outer winding.

4. The inflatable structure of claim 2, wherein one of the plurality of tethers has an ultimate length that is greater than an ultimate length of the remaining of the plurality of tethers.

5. The inflatable structure of claim 4, wherein, all of the plurality of tethers are elastic and have an equal stiffness.

6. The inflatable structure of claim 2, wherein at least one of the plurality of tethers is pre-tensioned.

7. The inflatable structure of claim 2, wherein at least one of the plurality of tethers has a stiffness that is different than a stiffness of the remaining of the plurality of tethers.

8. The inflatable structure of claim 2, wherein all of the plurality of tethers have an equal stiffness.

9. The inflatable structure of claim 8, wherein at least one of the plurality of tethers is pre-tensioned.

10. The inflatable structure of claim 2, wherein at least one of the plurality of tethers includes a first tether segment and a second tether segment, the first and second tether segments attached to one another end to end.

11. The inflatable structure of claim 10, wherein the first tether segment has a stiffness that is different than a stiffness of the second tether segment.

12. The inflatable structure of claim 11, wherein only one of the first tether segment and the second tether segment is elastic.

13. The inflatable structure of claim 10, wherein the first tether segment has an ultimate length that is different than an ultimate length of the second tether segment.

14. The inflatable structure of claim 10, wherein one of the first tether segment and the second tether segment is pre-tensioned.

15. The inflatable structure of claim 2, wherein an orientation of the top end cap when the inflatable structure is in the final support profile is different than an orientation of the top end cap when the inflatable structure is in the at least one intermediate support profile.

16. An inflatable structure comprising:
a top end cap;
a bottom end cap;
a bladder attached to the top and bottom end caps and configured to hold pressurized air between the top and bottom end caps;
a plurality of tethers disposed within the bladder, each tether in the plurality of tethers having a first end coupled to the top end cap and a second end coupled to the bottom end cap, wherein when the bladder is inflated, the bladder expands axially forcing the top end cap and the bottom end cap away from one another, the plurality of tethers adapted to restrict movement of the top end cap and the bottom end cap away from one another and limit axial expansion of the bladder, at least one of the plurality of tethers having an ultimate length that is different that an ultimate length of the remaining of the plurality of tethers, and all of the plurality of tethers have an equal stiffness;
wherein, at least one of the plurality of tethers is elastic, and the inflatable structure includes a final support profile, wherein all of the plurality of tethers are extended to an ultimate length, and at least one intermediate support profile, wherein at least one of the plurality of tethers is not extended to an ultimate length.

17. The inflatable structure of claim 16, wherein the at least one elastic tether comprises one of:
an elastic band;
a spring; and
an elastic core surrounded by an inelastic outer winding.

18. The inflatable structure of claim 16, wherein at least one of the plurality of tethers has an ultimate length that is greater than an ultimate length of the remaining of the plurality of tethers, and all of the plurality of tethers are elastic and have an equal stiffness.

19. The inflatable structure of claim 18, wherein the at least one elastic tether includes a first tether segment and a second tether segment, the first and second tether segments attached to one another end to end, at least one of the first tether segment and the second tether segment being elastic, the first tether segment having a stiffness that is different than a stiffness of the second tether segment, and the first tether segment having an ultimate length that is different than an ultimate length of the second tether segment.

20. The inflatable structure of claim 16, wherein all of the plurality of tethers have an equal ultimate length, and one of:
at least one of the plurality of tethers has a stiffness that is different than a stiffness of the remaining of the plurality of tethers; and
all of the plurality of tethers have an equal stiffness, and at least one of the plurality of tethers is pre-tensioned.

* * * * *